(12) United States Patent
Huang (10) Patent No.: US 7,471,507 B2
(45) Date of Patent: Dec. 30, 2008

(54) MOUNTING APPARATUS FOR EXPANSION CARDS

(75) Inventor: Ri-Dong Huang, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 227 days.

(21) Appl. No.: 11/292,251

(22) Filed: Dec. 1, 2005

(65) Prior Publication Data

US 2006/0120030 A1    Jun. 8, 2006

(30) Foreign Application Priority Data

Dec. 4, 2004    (CN) .................. 2004 2 0102410 U (51) Int. Cl.
*G06F 1/16*    (2006.01)

(52) U.S. Cl. ..................... 361/683; 312/223.2

(58) Field of Classification Search ............... 361/683, 361/740, 801; 312/183, 223.1
See application file for complete search history.

(56) References Cited

U.S. PATENT DOCUMENTS

| | | | |
|---|---|---|---|
| 4,745,524 A | 5/1988 | Patton, III | |
| 5,428,507 A * | 6/1995 | Chatel et al. | 361/801 |
| 5,575,546 A * | 11/1996 | Radloff | 361/683 |
| 5,694,291 A * | 12/1997 | Feightner | 361/683 |
| 5,822,196 A | 10/1998 | Hastings et al. | |
| 5,936,835 A * | 8/1999 | Astier | 361/683 |
| 5,982,627 A * | 11/1999 | Haughton et al. | 361/801 |
| RE36,695 E | 5/2000 | Holt | |
| 6,069,796 A | 5/2000 | Hastings et al. | |
| 6,157,532 A * | 12/2000 | Cook et al. | 312/223.2 |
| 6,173,843 B1 * | 1/2001 | Christensen et al. | 361/801 |
| 6,231,139 B1 * | 5/2001 | Chen | 361/801 |
| 6,278,614 B1 * | 8/2001 | Beaman et al. | 361/801 |
| 6,480,393 B1 * | 11/2002 | Chen | 361/801 |
| 6,487,070 B2 * | 11/2002 | Gan | 361/683 |
| 6,542,356 B2 * | 4/2003 | Gan | 361/683 |
| 6,552,913 B2 | 4/2003 | Tournadre | |
| 6,608,765 B2 | 8/2003 | Vier et al. | |
| 6,618,263 B1 * | 9/2003 | Kin-Wing et al. | 361/801 |
| 6,625,034 B2 * | 9/2003 | Davis et al. | 361/801 |
| 6,639,151 B1 * | 10/2003 | Chen et al. | 361/683 |
| 6,666,055 B2 * | 12/2003 | Janicek | 312/223.1 |

(Continued)

*Primary Examiner*—George Nguyen
*Assistant Examiner*—Adrian S Wilson
(74) *Attorney, Agent, or Firm*—Morris Manning Martin LLP; Tim Tingkang Xia, Esq.

(57) ABSTRACT

A mounting apparatus for mounting a plurality of expansion cards with cover plates includes a rear panel, a fixing member and a locking member. Each of the cover plates has a bent portion. The rear panel defines an opening. A supporting flange for supporting the bent portions extends outwardly from the rear panel at a bottom side of the opening. A through hole is defined in the rear panel. The fixing member is slidably mounted on an inner surface of the rear panel. A locking hole corresponding to the through hole is defined in the fixing member. The locking member includes a pressing part for pressing the bent portions, and a securing part. A hook corresponding to the through hole is formed on the securing part. A distal end of the pressing part is located on a distal end of the supporting flange of the rear panel.

10 Claims, 6 Drawing Sheets

U.S. PATENT DOCUMENTS

| | | | |
|---|---|---|---|
| 6,674,650 B1 * | 1/2004 | Davis et al. | 361/801 |
| 6,693,800 B1 * | 2/2004 | Lin et al. | 361/683 |
| 6,704,205 B1 * | 3/2004 | Chen | 361/801 |
| 6,721,183 B1 * | 4/2004 | Chen et al. | 312/223.2 |
| 6,775,144 B2 * | 8/2004 | Gan et al. | 312/223.1 |
| 6,834,766 B2 * | 12/2004 | Lin et al. | 361/683 |
| 7,035,117 B2 * | 4/2006 | Chen et al. | 361/801 |
| 7,161,798 B2 * | 1/2007 | Chen et al. | 361/683 |
| 2004/0037048 A1 | 2/2004 | Liao | |

* cited by examiner

MOUNTING APPARATUS FOR EXPANSION CARDS

BACKGROUND OF THE INVENTION

1. Field of the Invention

The present invention relates to mounting apparatuses for mounting expansion cards in computer enclosures, and particularly to a mounting apparatus which readily secures a plurality of expansion cards in a computer enclosure and allows convenient removal of the expansion cards therefrom.

2. Background of the Invention

In order to upgrade the operating capabilities of a personal computer, a plurality of expansion cards is operatively installed in the computer enclosure. Typical types of expansion cards include network cards, sound cards, graphics accelerator cards and multi-media cards, etc. These expansion cards may be installed in the computer enclosure during their original manufacture or by computer purchasers.

U.S. Pat. No. 4,745,524 discloses a plurality of mounting systems for mounting a plurality of expansion cards inside a computer chassis. Each mounting system includes a pressing element and a screw to secure a separate cover plate of a corresponding expansion card. However, installing screws one by one is time-consuming and cumbersome. Moreover, during installation/removal of the expansion cards, one or more of the screws can easily fall into the crowded interior of the computer, thereby creating a difficult retrieval.

What is needed is to provide a mounting apparatus which readily and securely attaches expansion cards in a computer enclosure.

SUMMARY

An exemplary mounting apparatus for mounting a plurality of expansion cards with cover plates to a computer enclosure includes a rear panel, a fixing member and a locking member. Each of the cover plates has a bent portion. The rear panel defines an opening. A supporting flange for supporting the bent portions of the expansion cards extends outwardly from the rear panel at a bottom side of the opening. A through hole is defined in the rear panel above the opening. The fixing member is slidably mounted on an inner surface of the rear panel above the opening. A locking hole corresponding to the through hole of the rear panel is defined in the fixing member. The locking member includes a pressing part for pressing the bent portions of the expansion cards, and a securing part extending from the pressing part. A hook corresponding to the through hole of the rear panel and the locking hole of the locking member is formed on the securing part. A distal end of the pressing part is located on a distal end of the supporting flange of the rear panel.

Other advantages and novel features of the invention will become more apparent from the following detailed description when taken in conjunction with the accompanying drawings, in which:

DETAILED DESCRIPTION OF THE EMBODIMENT

Figure 1:
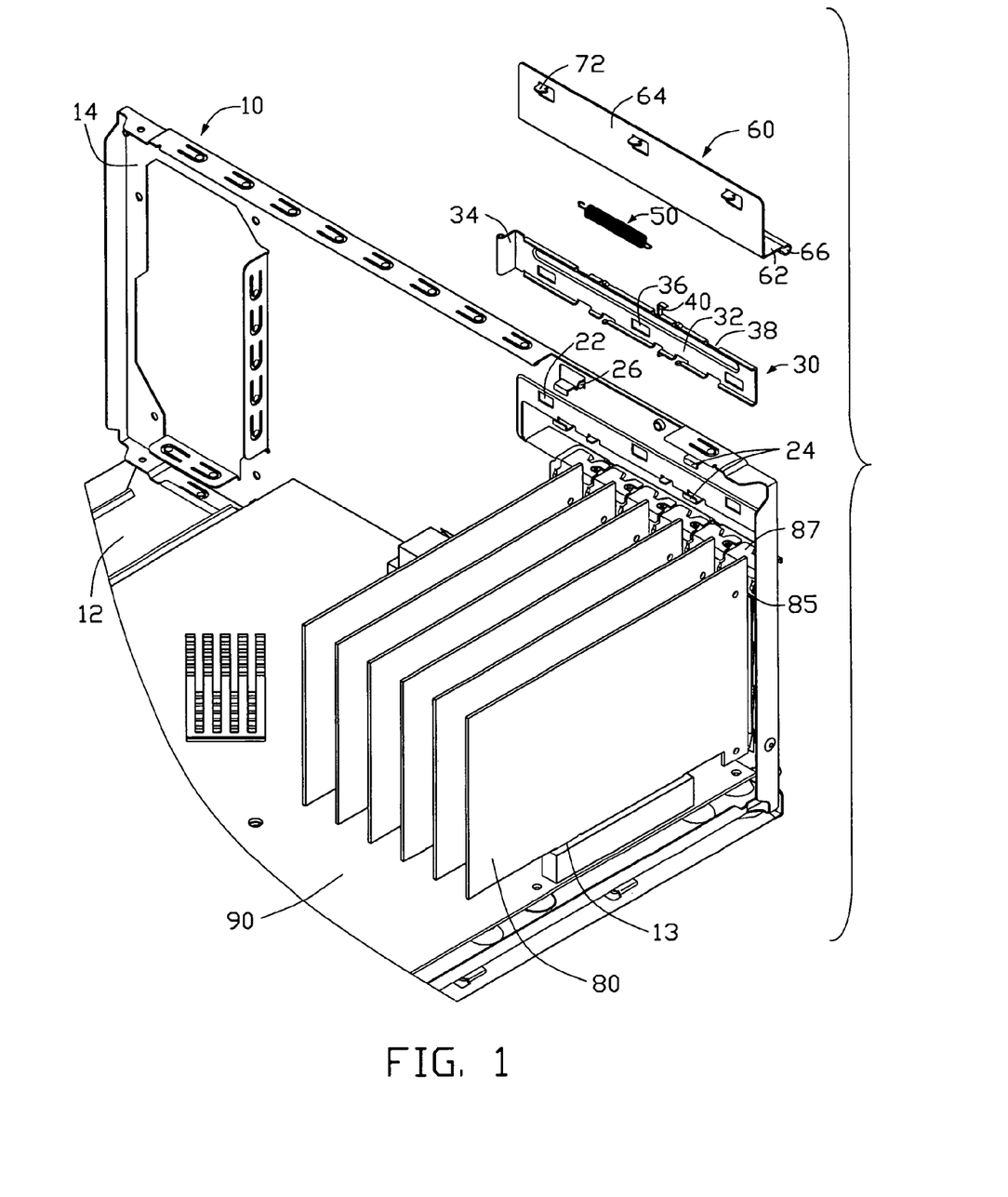
FIG. 1 is an exploded, isometric view of a mounting apparatus in accordance with a preferred embodiment of the present invention, together with a circuit board, a plurality of expansion cards and a plurality of cover plates for expansion cards, the mounting apparatus comprising a chassis, a fixing member, an elastic member and a locking member.
Figure 2:
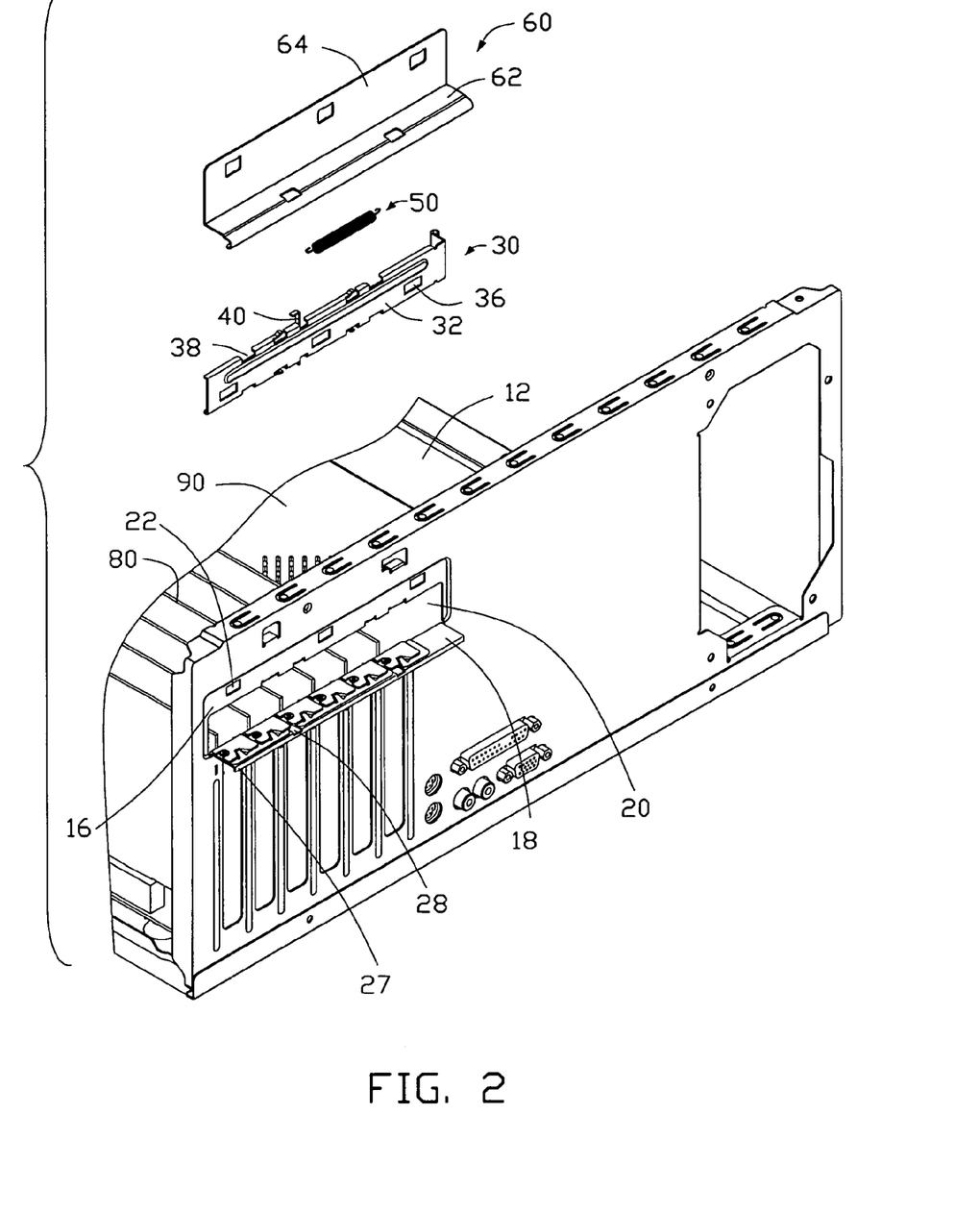
FIG. 2 is similar to FIG. 1, but viewed from another aspect.

Referring to FIGS. 1 and 2, a mounting apparatus for expansion cards of an electronic device like a computer in accordance with a preferred embodiment of the present invention is shown for mounting a plurality of expansion cards 80 with cover plates 85 to a computer enclosure. The mounting apparatus includes a chassis 10, a fixing member 30, an elastic member 50 and a locking member 60.

The chassis 10 includes a bottom panel 12 supporting a circuit board 90 and a rear panel 14 extending upwardly from a rear side of the bottom panel 12. The circuit board 90 defines a plurality of expansion slots 13 therein for engaging with the corresponding expansion cards 80. The rear panel 14 is stamped inwardly to form a recess 16 at an upper portion thereof. A supporting flange 18 is stamped outwardly perpendicularly from a lower portion of the recess 16 with an opening 20 defined in the recess 16. A plurality of through holes 22 is defined in an upper portion of the recess 16. Two pairs of L-shaped limiting tabs 24 extend inwardly from the rear panel 14. One pair of the limiting tabs 24 is arranged at a top edge of the opening 20. The other pair of the limiting tabs 24 is arranged at an upward side of the recess 16. A first hooking tab 26 extends inwardly from the rear panel 14 at the upward side of the recess 16. A pivot shaft 27 extends downwardly from a distal end of the supporting flange 18. A pair of apertures 28 is defined in the supporting flange 18 and adjacent to the pivot shaft 27.

The fixing member 30 includes a body 32 and an operation part 34 extends perpendicularly from an end of the body 32. A plurality of locking holes 36 corresponding to the through holes 22 of the rear panel 14 is defined in the body 32. Two pairs of avoiding gaps 38 corresponding to the limiting tabs 24 of the rear panel 14 are defined in the body 32. One pair of the gaps 38 is arranged at a top edge of the body 32. The other pair of the gaps 38 is arranged at a bottom edge of the body 32. A second hooking tab 40 corresponding to the first hooking tab 26 of the rear panel 14 extends upwardly from the top edge of the body 32.

Figure 3:
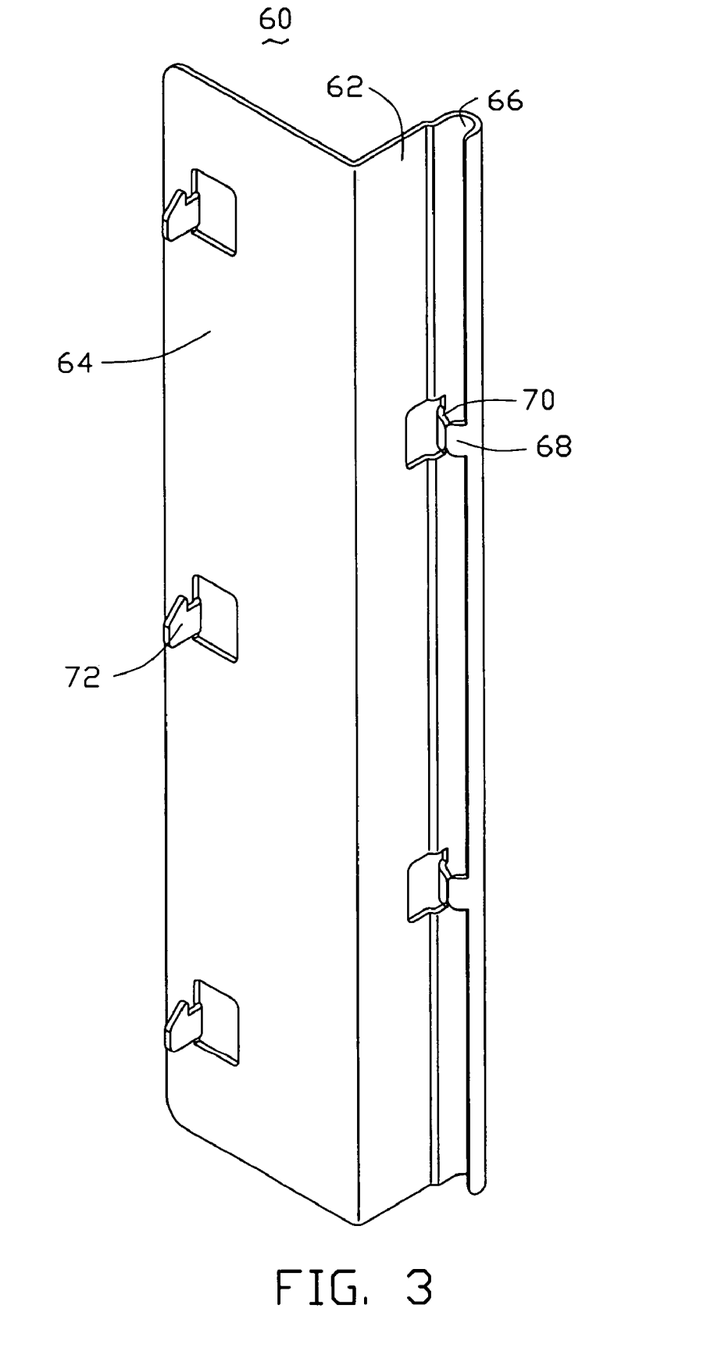
FIG. 3 is an enlarged, isometric view of the locking member of FIG. 1, but viewed from another aspect.

Referring also to FIG. 3, the locking member 60 includes a horizontal pressing part 62 and a vertical securing part 64 extends upwardly from a front side of the pressing part 62. An arc-shaped pivotable portion 66 extends downwardly from a distal end of the pressing part 62. A pair of first finger-shaped tabs 68 extends from a distal end of the pivotable portion 66. A pair of second finger-shaped tabs 70 corresponding to the first finger-shaped tabs 68 is stamped from the pressing part 62. A plurality of L-shaped hooks 72 corresponding to the through holes 22 of the rear panel 14 and the locking holes 36 of the fixing member 30 is perpendicularly stamped from the securing part 64.

Figure 4:
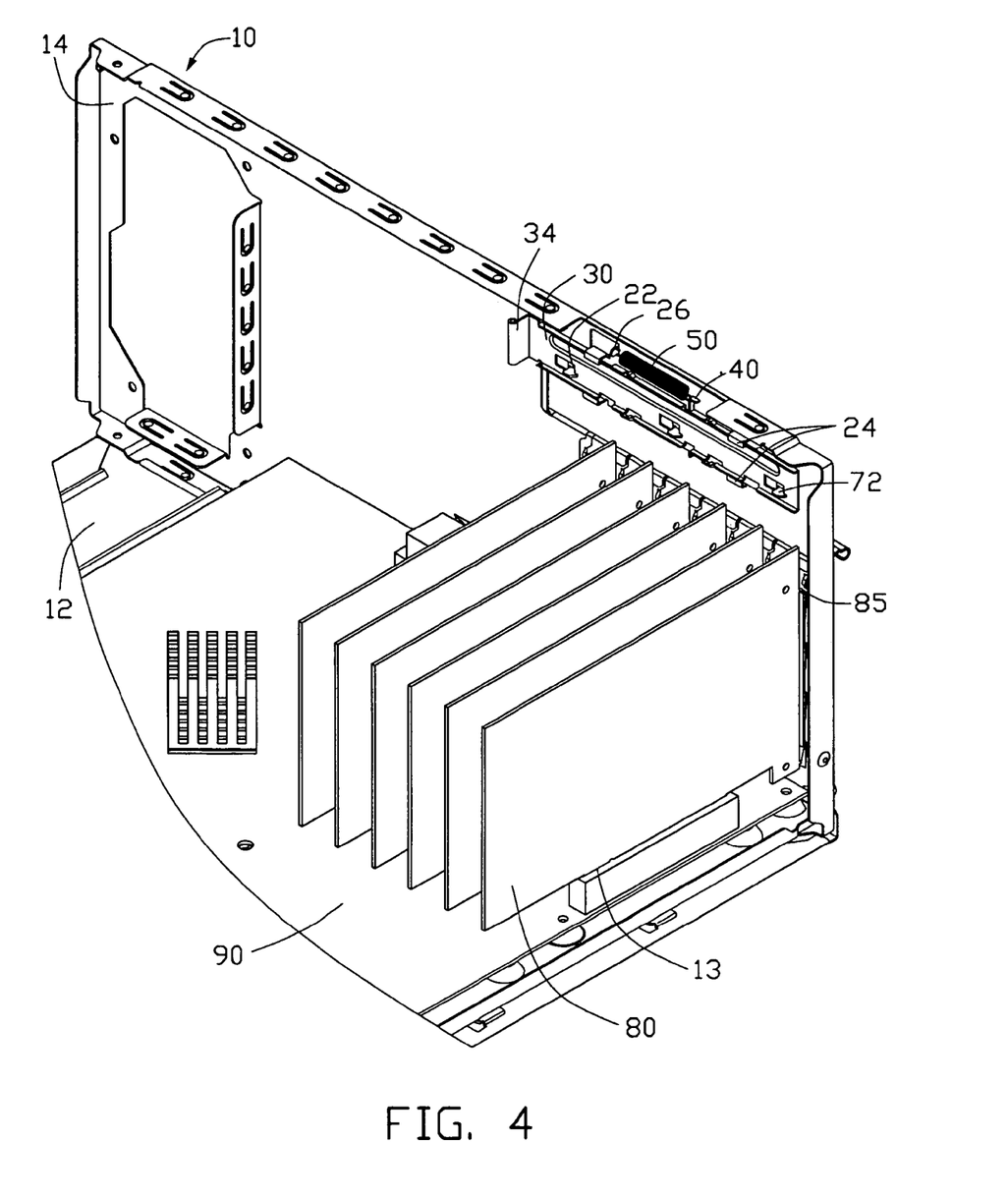
FIG. 4 is an assembled view of FIG. 1.
Figure 5:
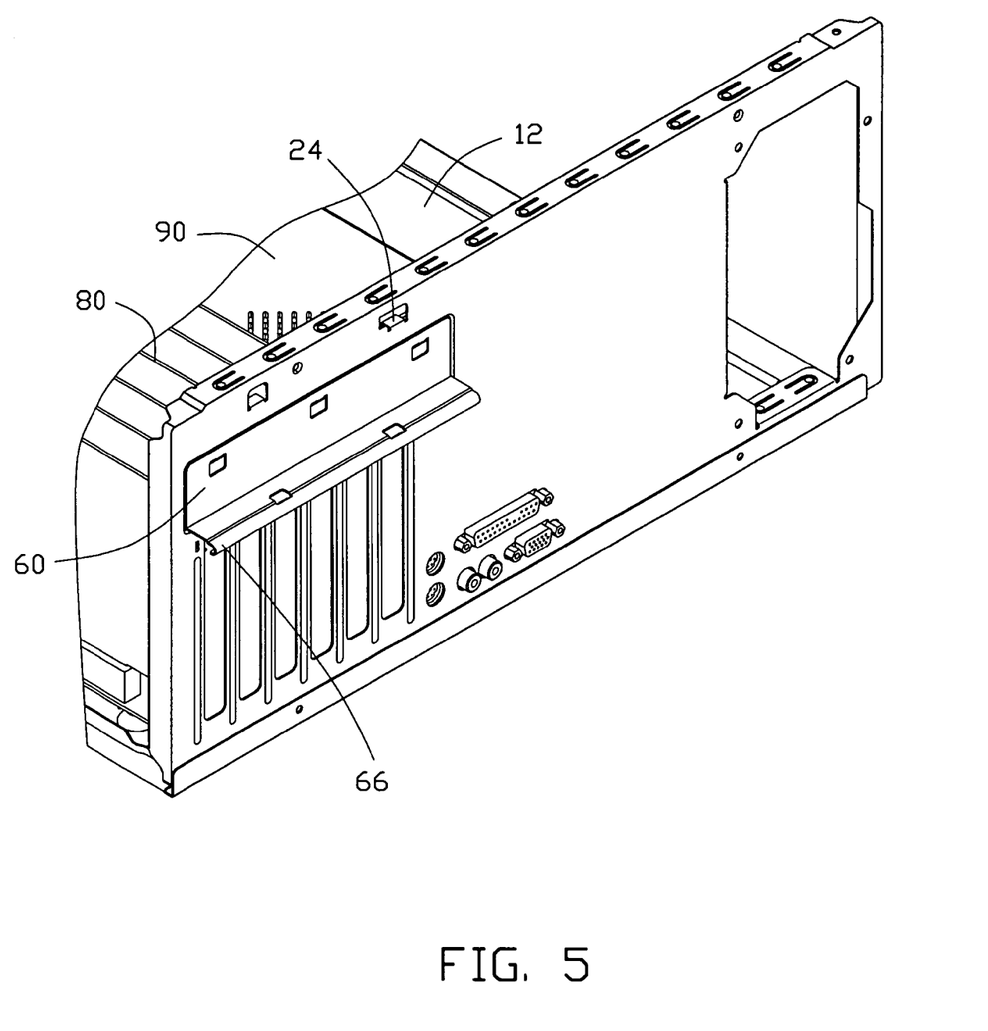
FIG. 5 is an assembled view of FIG. 2.
Figure 6:
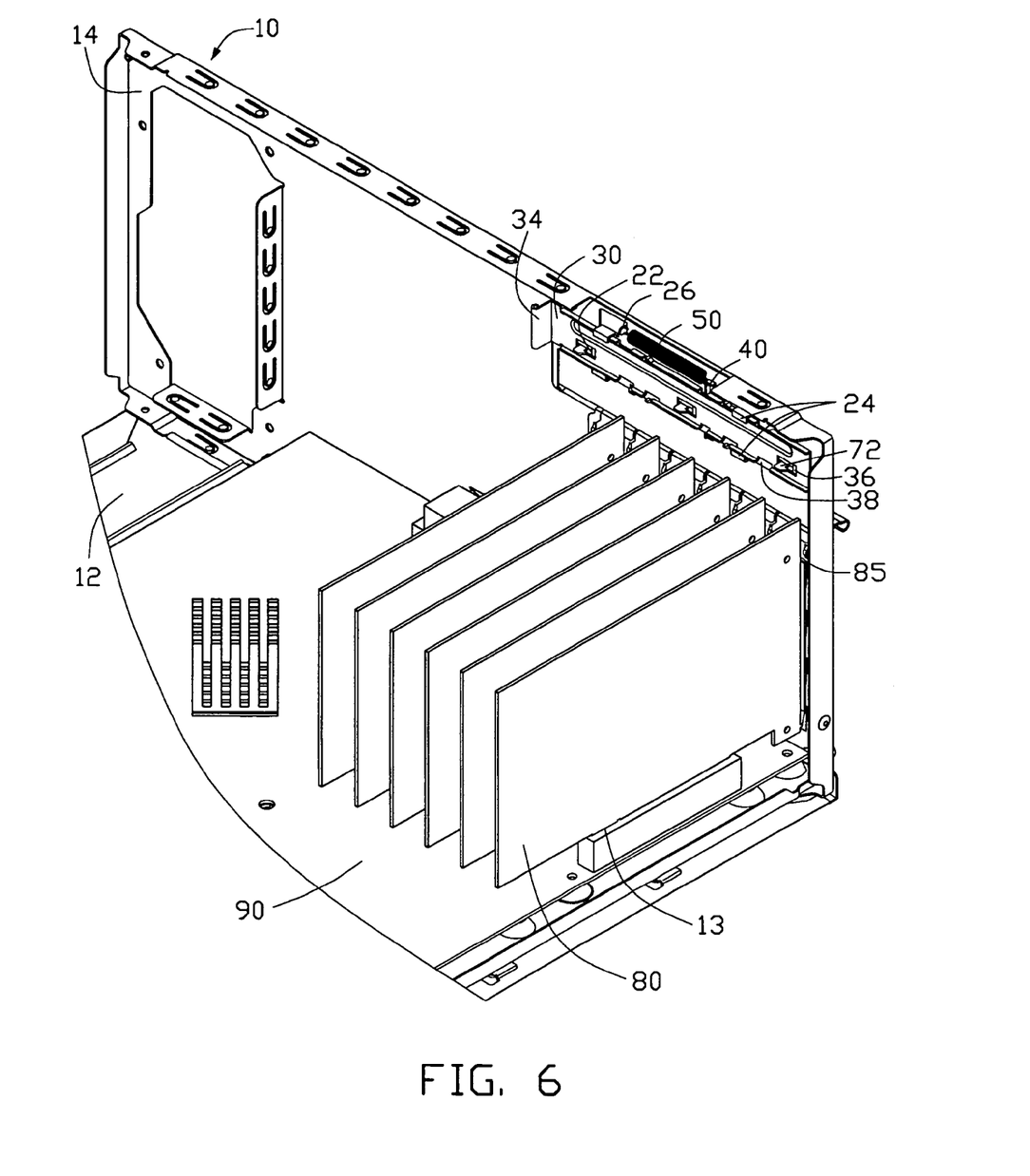
FIG. 6 is an assembled view of FIG. 1, showing the locking member thereof in an unlocking state.

Referring also to FIGS. 4-6, in assembling the mounting apparatus, the fixing member 30 is put on an inner surface of the rear panel 14 with the avoiding gaps 38 aiming at the corresponding limiting tabs 24. The fixing member 30 is pushed to avoid the avoiding gaps 38 aiming at the corresponding limiting tabs 24. One end of the elastic member 50 hangs the first hooking tab 26. The other end of the elastic member 50 hangs the second hooking tab 40. The fixing member 30 is slidably mounted between the two pairs of the limiting tabs 24 of the rear panel 14. The locking member 60 is put on an outer surface of the rear panel 14 with the pivotable portion 66 of the locking member 60 covering the pivot shaft 27 of the rear panel 14. The second finger-shaped tabs 70 of the locking member 60 traverse the corresponding apertures 28 of the rear panel 14 and are bent toward the corresponding first finger-shaped tabs 68 of the locking member 60. Thus, each first finger-shaped tab 68 and its corresponding second finger-shaped tab 70 form a ring. The locking member 60 is pivotably hanged on the supporting flange 18 of the rear panel 14 via the rings.

In assembling the expansion cards 80 to the chassis 10, bottoms of the expansion cards 80 are inserted into the expansion slots 13 of the circuit board 90. And bent portions 87 of the cover plates 85 are put on the supporting flange 18 of the rear panel 14. The operation part 34 of the fixing member 30 is pushed where the locking holes 36 of the body 32 align with the corresponding through holes 22 of the rear panel 14. Meanwhile, the elastic member 50 is elastically drawn. The locking member 60 is rotated inwardly round the pivot shaft 27 of the supporting flange 18 until the hooks 72 of the securing part 64 of the locking member 60 traverse the corresponding through holes 22 of the rear panel 14 and the corresponding locking holes 36 of the fixing member 30. The operation part 34 of the fixing member 30 is released. And the body 32 of the fixing member 30 is elastically restored. The locking holes 36 of the fixing member 30 engage with the corresponding hooks 72 of the locking member 60. The pressing part 62 of the locking member 60 presses the bent portions 87 of the cover plates 85. Thus, the expansion cards 80 are secured in the chassis 10.

In disassembling the expansion cards 80 from the chassis 10, the operation part 34 of the fixing member 30 is pushed until the locking holes 36 of the body 32 aligning with the corresponding through holes 22 of the rear panel 14. The locking member 60 is rotated outwardly round the pivot shaft 27 of the rear panel 14, until the hooks 72 of the locking member 60 disengage from the locking holes 22 of the rear panel 14 and the pressing part 62 is apart from the supporting flange 18 of the rear panel 14. Thus, the expansion cards 80 can be removed from the chassis 10.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment of the invention.

I claim:

1. A mounting apparatus for mounting a plurality of expansion cards with cover plates to a computer enclosure, each of the cover plates having a bent portion, the mounting apparatus comprising:
    a rear panel defining an opening, a supporting flange for supporting the bent portions of the expansion cards extending outwardly from the rear panel at a bottom side of the opening, a through hole defined in the rear panel above the opening;
    a fixing member slidably mounted on an inner surface of the rear panel above the opening, a locking hole corresponding to the through hole of the rear panel defined in the fixing member;
    a locking member comprising a pressing part for pressing the bent portions of the expansion cards, and a securing part, a hook corresponding to the through hole of the rear panel and the locking hole of the locking member formed on the securing part; and
    an elastic member with one end being connected to the fixing member, the other end being connected to the rear panel, configured to bias the fixing member to slide to make an edge of the fixing member engage with the hook of the locking member through the through hole;
    wherein the edge of the fixing member is perpendicular to the sliding direction of the fixing member; and
    wherein a pivot shaft extends downwardly from the distal edge of the supporting flange opposite to a connecting edge of the supporting flange connected to the bottom side of the opening, a pivotable portion extends downwardly from an edge of the pressing part opposite to a connecting edge of the pressing part connected to the securing part of the locking member, the pivotable portion of the locking member pivotably sleeves the pivot shaft of the supporting flange.

2. The mounting apparatus as claimed in claim 1, wherein an upper portion of the rear panel at an outer surface defines a recess, the opening is defined in a lower portion of the recess.

3. The mounting apparatus as claimed in claim 2, wherein the fixing member comprises a body and an operation part extending from an end of the body, a pair of through holes is defined in an upper portion of the recess, a pair of locking holes is defined in the body, a pair of hooks extends inwardly from the securing part of the locking member, two rows of limiting tabs extend inwardly from the rear panel for holding the body therein respectively located above the recess and at a top side of the opening.

4. The mounting apparatus as claimed in claim 1, wherein a pair of apertures is defined in the distal end of the supporting flange, a pair of rings is formed at the distal end of the supporting flange of the locking member, the locking member is hanged on the supporting flange via the rings hooking the corresponding apertures.

5. A mounting apparatus for mounting a plurality of expansion cards with cover plates to a computer enclosure, each of the cover plates having a bent portion, the mounting apparatus comprising:
    a rear panel defining an opening, a supporting flange for supporting the bent portions of the expansion cards extending outwardly from the rear panel at a bottom side of the opening, a through hole defined in the rear panel above the opening;
    a fixing member slidably mounted on an inner surface of the rear panel above the opening, a locking hole corresponding to the through hole of the rear panel defined in the fixing member;
    a locking member comprising a pressing part for pressing the bent portions of the expansion cards, and a securing part formed at one end of the pressing part, the locking member pivotably mounted to the supporting flange of the rear panel via the other end of the pressing part, a hook corresponding to the through hole of the rear panel and the locking hole of the fixing member formed on the securing part; and
    an elastic member with one end being connected to the fixing member, the other end being connected to the rear panel, to bias the fixing member to slide to make an edge of the fixing member engage with the hook of the locking member through the through hole;
    wherein the edge of the fixing member is perpendicular to the sliding direction of the fixing member; and
    wherein a pivot shaft extends downwardly from the distal edge of the supporting flange opposite to a connecting edge of the supporting flange connected to the bottom side of the opening, a pivotable portion extends downwardly from an edge of the pressing part opposite to a connecting edge of the pressing part connected to the securing part of the locking member, the pivotable portion of the locking member pivotably sleeves the pivot shaft of the supporting flange.

6. The mounting apparatus as claimed in claim 5, wherein an upper portion of the rear panel at an outer surface defined a recess, the opening is defined in a lower portion of the recess.

7. The mounting apparatus as claimed in claim 6, wherein the fixing member comprises a body and an operation part extending from an end of the body, a pair of through holes is defined in an upper portion of the recess, a pair of locking holes is defined in the body, a pair of hooks extends inwardly from the securing part of the locking member, two rows of limiting tabs extend inwardly from the rear panel for holding the body therein respectively located above the recess and at a top side of the opening.

8. The mounting apparatus as claimed in claim 5, wherein a pair of apertures is defined in the distal end of the supporting flange, a pair of rings is formed at the distal end of the supporting flange of the locking member, the locking member is hanged on the supporting flange via the rings hooking the corresponding apertures.

9. An electronic device comprising:
  an enclosure of said electronic device capable of accommodating components of said electronic device therein, said enclosure defining a panel at a side thereof;
  at least one expansion card used to expand function for said electronic device detachably installable in said enclosure against said panel so as to expose a portion thereof from said panel;
  a locking member capable of removably resting against said panel and said portion of said at least one expansion card so as to secure said at least one expansion card in said enclosure, said locking member removable away from said portion of said at least one expansion card for releasing said at least one expansion card;
  a fixing member movable to engage with said locking member for securing said locking member in a resting position thereof against said panel and said portion of said at least one expansion card, and to disengage from said locking member for releasing said locking member to be removable out of said resting position thereof; and
  an elastic member with one end being connected to said fixing member, the other end being connected to said panel, to bias said fixing member to move back to engage with said locking member; and
  wherein a pivot shaft extends downwardly from the distal edge of the supporting flange opposite to a connecting edge of the supporting flange connected to the bottom side of the opening, a pivotable portion extends downwardly from an edge of the pressing part opposite to a connecting edge of the pressing part connected to the securing part of the locking member, the pivotable portion of the locking member pivotably sleeves the pivot shaft of the supporting flange.

10. The electronic device as claimed in claim 9, wherein said locking member is capable of resting in said resting position thereof at a side of said panel opposite to said fixing member.

* * * * *